April 27, 1943.  F. BERGTOLD  2,317,724

SHIELDED COIL WITH TEMPERATURE COMPENSATION

Filed Nov. 19, 1940

INVENTOR
FRITZ BERGTOLD
BY
ATTORNEY

Patented Apr. 27, 1943

2,317,724

UNITED STATES PATENT OFFICE 2,317,724

SHIELDED COIL WITH TEMPERATURE COMPENSATION

Fritz Bergtold, Munich, Germany; vested in the Alien Property Custodian

Application November 19, 1940, Serial No. 366,235
In Germany May 17, 1939

5 Claims. (Cl. 171—242)

The present invention relates to a temperature compensated inductance device.

Figure 1:
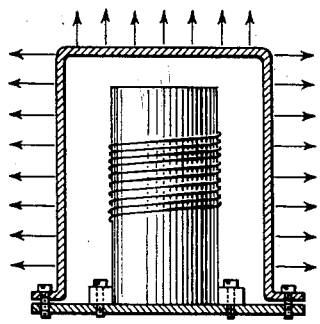

For a clear understanding of the invention reference will be made to the accompanying drawing wherein Fig. 1 shows a coil and an enclosing shield of known construction which will serve to explain the effect of temperature change on the coil inductance, and Figs. 2, 3 and 4 disclose various embodiments according to the invention.

In order to render the inductance of a coil independent of the temperature, the coil is wound on a Calit cylinder whose dimensions are almost independent of the temperature, the material of such cylinder having a low temperature coefficient of expansion. When such a coil is placed in a shielding cup made from aluminum, or copper, it is found that the coil inductance is dependent upon the temperature for the reason that the dimensions of the shielding cup change with the temperature. Figure 1 indicates that with an increase in the temperature, there results an increase in the distance of the walls of the cup from the coil as well as the distance between the frontal side of the coil and the bottom of the cup. Owing to the increase in these distances the inductance increases. It has been proposed to eliminate the temperature influence of the shielding cup by adapting the shield in the form of a comparatively thin covering of a Calit body. However, such a shielding cup is very expensive and has a relatively great weight. Furthermore, danger exists that the thin metal covering chips off in scales.

Figure 2:
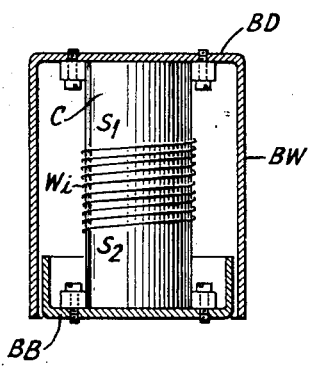
Figure 3:
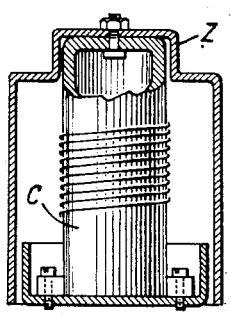

According to the present invention, as disclosed in Fig. 2, the effect of temperature upon the shielding cup is substantially diminished by fixedly joining with the coil body C consisting of Calit, the cover BD of the cup facing the frontal side $S_1$ of the coil $W_1$ as well as a cup bottom BB facing the other frontal side $S_2$ of the coil, the parts BB and BW forming a pair of telescoped members. In this way the distance in the direction of the axis is rendered independent of the temperature by the coil body. This distance has by far the most predominant influence upon the inductance so that such a fixing of such distance is in most cases sufficient. If it is desired also to compensate the slight influence exerted upon the inductance due to the change of the transverse distance between the side wall BW of the cup and the coil $W_1$, the shielding cup can be given a form such that the distance existing in the direction of the axis is made to have at will a desired relationship with respect to the temperature. An example of a suitable construction for this case is shown in Figure 3, where the two parts of the shielding means, relative to one another, are rendered independent of the temperature in the direction of the axis by the coil body C. The cylindrical border or neck portion Z provides a dependence on the temperature of the position of the cover of the cup such that when the shielding cup expands the cover moves closer to the coil end which faces it whereby the increase in the distance of the wall of the cup from the surface of the coil is compensated.

Figure 4:
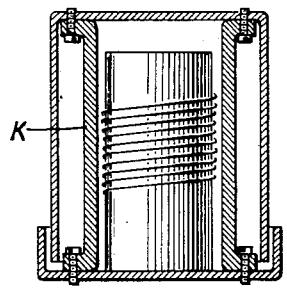

For establishing the independence on the temperature also other bodies similar to the coil body may be employed, as shown for example in Fig. 4 where the cylindrical member K is arranged concentrically with respect to the coil body and to the opposite ends of which the telescoped shield parts are attached.

With the aid of the idea of the present invention the influence exerted upon the coil owing to the change in the shielding means can be diminished to any desired extent in a simple manner without the need of special compensating means and with a simple and inexpensive production of the shielding cups.

I claim:

1. In a temperature compensated inductance device, an inductance coil, a metallic shielding housing for said coil comprising a pair of substantially coaxial telescoped members, said coil being mounted within said housing so that the axis of the coil is substantially parallel to the axis of the housing, a spacing element composed of material having a low temperature coefficient of expansion, said element having one end fixedly connected to the frontal side of one of said telescoped members and its other end fixedly connected to the frontal side of the other of said telescoped members, said element acting to maintain the distance between the two frontal sides of said members substantially constant irrespective of temperature changes.

2. In a temperature compensated inductance device, an inductance coil, a housing for said coil comprising a cup-shaped metallic shielding member, said coil being mounted within said shielding member substantially coaxial therewith, a metallic cover for said shielding member and a spacing element composed of material having a low temperature coefficient of expansion connected between the frontal side of said cup-shaped member and said cover member for maintaining the distance between the cover member and the frontal side of said shielding member substantially constant irrespective of temperature changes.

3. The arrangement described in the next preceding claim wherein said spacing element is mounted within said housing substantially coaxial therewith and comprises a coil form for supporting said coil.

4. In a temperature compensated inductance device, a substantially cylindrical coil form composed of material having low temperature coefficient of expansion, a coil wound around said form, a cup-like metallic shielding member forming an enclosure for said coil form, said cup-like member having formed on the frontal end thereof an outwardly extending hollow neck whereby said shielding member comprises a main body portion, a neck portion and a joining shoulder portion, one end of said coil form being inserted within said hollow neck and fixedly mounted to the frontal side thereof, an axially adjustable metallic cover for said shielding member and means fixedly connecting the other end of said coil form to said cover, the dimensions of the neck portion of the shielding member being related to the main body portion thereof so that variations in the inductance of the coil due to displacement of the shoulder portion of the shielding member with changes in temperature are substantially compensated by inductance changes caused by said main body portion of the shielding member.

5. In combination, a coil form composed of material having low temperature coefficient of expansion, a coil wound around said coil form, a cup-like metallic shielding member forming an enclosure for said coil form, one end of said form being fixedly mounted on the inside of the frontal side of said shielding member and a metallic telescoping cover member for closing the open end of said shielding member, the other end of said coil form being fixedly connected to the inside face of said cover member whereby the distance between the frontal side of the shielding member and the cover member remains substantially the same irrespective of changes in temperature.

FRITZ BERGTOLD.